US012704244B2

(12) United States Patent
Tian et al.

(10) Patent No.: US 12,704,244 B2
(45) Date of Patent: Aug. 11, 2026

(54) LIGHTING APPARATUS

(71) Applicant: SIGNIFY HOLDING B.V., Eindhoven (NL)

(72) Inventors: Chao Nan Tian, Shanghai (CN); Rui Pan Zhang, Shanghai (CN); Chen Ji, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 300 days.

(21) Appl. No.: 18/701,961

(22) PCT Filed: Oct. 17, 2022

(86) PCT No.: PCT/EP2022/078817

§ 371 (c)(1),
(2) Date: Apr. 17, 2024

(87) PCT Pub. No.: WO2023/066858

PCT Pub. Date: Apr. 27, 2023

(65) Prior Publication Data

US 2026/0168661 A1 Jun. 18, 2026

(30) Foreign Application Priority Data

Oct. 18, 2021 (WO) ................ PCT/CN2021/124480
Dec. 6, 2021 (EP) .................................... 21212538

(51) Int. Cl.
*F21V 23/04* (2006.01)
*F21S 8/02* (2006.01)
(Continued)

(52) U.S. Cl.
CPC .......... *F21V 23/0435* (2013.01); *F21V 3/049* (2013.01); *F21V 7/041* (2013.01);
(Continued)

(58) Field of Classification Search
CPC . F21S 8/026; F21V 23/0435; F21W 2131/406
See application file for complete search history.

(56) References Cited

U.S. PATENT DOCUMENTS 4,232,361 A * 11/1980 Kelsall .................... F21V 21/30 362/404
9,726,360 B1 8/2017 Alexander et al.
(Continued)

FOREIGN PATENT DOCUMENTS

BE 1026717 A1 5/2020
CN 209909780 U 1/2020
(Continued)

*Primary Examiner* — Keith G. Delahoussaye

(57) ABSTRACT

A luminaire comprising: a luminaire support frame (1); and a lighting device (10) connected to the luminaire support frame; wherein the lighting device (10) comprises: a housing (2) comprising a connection interface (2A) configured to facilitate connection of the housing to the luminaire support frame (1) and defining an axis of rotation (15), such that, when connected to the luminaire support frame, the housing is configured to permit rotation of the lighting device relative to the luminaire support frame about the axis of rotation; a wireless communication interface (5, 6) coupled to the housing and configured to transmit or receive, via a wireless communication link, a wireless control signal; and a control circuit (3) coupled to the housing and configured to: control an operation of the lighting device; and transmit or receive a wireless control signal wireless to/from communication interface, wherein the wireless communication interface comprises: first (5) and second (6) antennas spaced apart from and on opposite sides of the axis of rotation; wherein the luminaire support frame comprises a metal enclosure and wherein, in use, when the lighting device is at a tilted position relative to metal enclosure, one of the first and second antennas is unshielded by the metal enclosure.

13 Claims, 5 Drawing Sheets

(51) Int. Cl.

| | |
|---|---|
| ***F21V 3/04*** | (2018.01) |
| ***F21V 7/04*** | (2006.01) |
| ***F21V 29/70*** | (2015.01) |
| ***F21W 131/406*** | (2006.01) |
| ***F21Y 115/10*** | (2016.01) |

(52) U.S. Cl.
CPC ............... *F21V 29/70* (2015.01); *F21S 8/026* (2013.01); *F21W 2131/406* (2013.01); *F21Y 2115/10* (2016.08)

(56) References Cited

U.S. PATENT DOCUMENTS

| | | | | |
|---|---|---|---|---|
| 2010/0026479 | A1 | 2/2010 | Tran | |
| 2012/0274208 | A1* | 11/2012 | Chen | H05B 47/19 315/34 |
| 2013/0285544 | A1 | 10/2013 | Molezion | |
| 2018/0224094 | A1* | 8/2018 | Al-Khulaifi | F21V 21/15 |
| 2018/0224104 | A1 | 8/2018 | Bernard et al. | |

FOREIGN PATENT DOCUMENTS

| | | | |
|---|---|---|---|
| JP | H0757502 | A | 3/1995 |
| JP | 2012529143 | A | 11/2012 |
| WO | 2005024294 | A1 | 3/2005 |
| WO | 2014173852 | A1 | 10/2014 |

* cited by examiner

LIGHTING APPARATUS

CROSS-REFERENCE TO PRIOR APPLICATIONS

This application is the U.S. National Phase application under 35 U.S.C. § 371 of International Application No. PCT/EP2022/078817, filed on Oct. 17, 2022, which claims the benefit of European Patent Application No. 21212538.9, filed on Dec. 6, 2021 and International Application No. PCT/CN2021/124480, filed on Oct. 18, 2021. These applications are hereby incorporated by reference herein.

FIELD OF THE INVENTION

This invention relates to lighting apparatus.

BACKGROUND OF THE INVENTION

Lighting apparatus (such as LED spotlights or downlights) are widely known and typically used as illumination devices (i.e. devices that illuminate an area by emitting light from one or more lighting units or light sources).

It is known to provide such lighting apparatus with wireless control functionality, for example by integrating a RF-based wireless communication interface and control circuit into a spotlight. In this way, a lighting apparatus may be configured to transmit and/or receive, via a wireless communication link, wireless control signals for controlling one or more operational aspects of the lighting apparatus. That is, LED spotlight/downlights with integrated RF wireless control functionality are known.

However, RF signal transmission/reception issues can adversely impact control functionality and/or performance. For example, LED spotlight/downlights typically comprise a metal support frame (i.e. external housing), typically referred to as a “metal can”, for installation in a support surface. Such a metal support frame is for fire-hazard prevention when the spotlight/downlight is installed in wooden ceiling or roof, for example. However, this also encloses RF communication components and thus reduces RF signal transmission/reception strength.

Furthermore, it is common for LED spotlight/downlights to be tiltable, i.e. adapted to permit rotation of the lighting unit relative to the support frame about an axis of rotation (thereby allowing an angle of illumination to be adjusted by a user, for example). Such tilting/rotation of the lighting unit may alter an RF antenna direction thus making the RF performance unstable.

BE 1026717A1 discloses a movable fixture system comprising: a base, a yoke rotatably connected to the base, a fixture rotatably connected to the yoke, the fixture adapted to include at least one light source, at least one actuator adapted to rotate at least one of the yoke about a yoke axis and the armature about an armature axis, and a wireless communication interface.

SUMMARY OF THE INVENTION

The invention is defined by the claims.

According to examples in accordance with an aspect of the invention, there is provided a lighting device adapted to be connected to a luminaire support frame. The lighting device comprises: a housing comprising a connection interface configured to facilitate connection of the housing to a luminaire support frame and defining an axis of rotation, such that, when connected to the support frame, the housing is configured to permit rotation of the lighting device relative to the luminaire support frame about the axis of rotation; a wireless communication interface coupled to the housing and configured to transmit or receive, via a wireless communication link, a wireless control signal; and a control circuit coupled to the housing and configured to: control an operation of the lighting device; and transmit or receive a wireless control signal wireless to/from communication interface. The wireless communication interface comprises: first and second antennas spaced apart from and on opposite sides of the axis of rotation.

Proposed concepts thus aim to provide schemes, solutions, concepts, designs, and apparatus pertaining to improving communication performance of a lighting apparatus with wireless control functionality. In particular, embodiments of the invention propose an arrangement of first and second antennas that may improve RF communication performance of a tiltable lighting device. Depending on tilted/rotated position of the light device in use, one of the first and second antennas may have a better (i.e. stronger) RF signal transmission/reception strength that the other. In this way, RF signal transmission/reception strength of the lighting device may be maintained irrespective of tilt/orientation during use.

In particular, it is proposed that a lighting device for connection to a luminaire support frame (e.g. metal can) may be provided with first and second antennas that are spaced apart from and on opposite sides of the axis of rotation of the lighting device. Such a proposal may thus address the issue of RF signal shielding (caused by the luminaire support frame, which is typically metal) by employing two antenna wires on opposite sides of the lighting device. A control circuit of the lighting device may then choose between signals received via the two antenna wires and use the one that has better signal transmission/reception strength.

A proposed arrangement of the first and second antennas may also provide the benefit of avoiding any negative impact on the optical performance (e.g. light emission strength/efficiency) of the lighting device.

Embodiments may therefore provide the advantage that RF signal transmission/reception strength can be maintained, irrespective of a tilt angle of the lighting device when in use. For example, through the employment of two antennas spaced apart on opposite sides of the axis of rotation of the lighting device, one of the antennas may always project/extend outwardly from the luminaire support frame and thus attain a stronger RF signal strength. The antenna with stronger RF signal strength may be easily identified and thus used for RF signal transmission and/or reception. By way of example, the Reception Signal Strength Indicator (RSSI) value may be obtained and compared for the first and second antennas. If the difference between the two RSSI values exceeds a predetermined threshold value N (e.g. 5), the antenna with the large RSSI value may be selected for use as the main antenna.

In other words, embodiments propose a lighting device for tiltable connection to a luminaire support frame, wherein the lighting device is tiltable about an axis of rotation when connected to the luminaire support frame, and wherein the lighting device has a wireless communication interface comprising first and second antennas spaced apart from and on opposite sides of an axis of rotation. The arrangement of the first and second antennas may improve wireless communication signal transmission/reception strength.

In some embodiments, the connection interface may comprise first and second apertures located on opposite sides of the housing, and wherein the axis of rotation passes through the first and second apertures. In this way, the lighting device may be provided with the female parts of a connection interface (for connection with male parts provided on the luminaire support frame).

In other embodiments, the connection interface may comprise first and second projections located on opposite sides of the housing, and wherein the axis of rotation intersects the first and second apertures. Thus, the lighting device may be provided with the male parts of a connection interface (for connection with female parts provided on the luminaire support frame).

Embodiments may thus be provided with a relatively simple connection interface that facilitates connection of the housing to a luminaire support frame, wherein the connection permits rotation of the lighting device relative to the luminaire support frame about the axis of rotation. That is, embodiments of the proposed lighting device may be connected with a luminaire support frame so as to provide a titling downlight or spotlight.

In an exemplary embodiment, the axis of rotation may lie in a lighting plane extending in a lighting direction of the lighting device. For example, when employed in a downlight while a metal enclosure is embedded in a (false) ceiling, the lighting plane may be a substantially vertical plane, and the axis of rotation may lie across the lighting plane in a substantially horizontal direction parallel to the ceiling. The first and second antennas may then be located on opposite sides of the lighting plane. That is, the antenna may be positioned on either side of a vertical plane extending down through the centre of the light device (when installed as a downlight).

In some embodiments, the axis of rotation may lie in a light exit plane that is substantially perpendicular to the lighting plane. For example, when employed in a downlight, the light exit plane may be a substantially horizontal plane that lies across the downwardly facing opening on the housing. In this way, the light exit plane may cut across the vertical lighting plane of a downlight configuration. The first and second antennas may intersect the light exit plane, e.g. so that the antennas extend outward and downward from the opening of the housing.

Yet further, the housing may comprise a light exit aperture through which the lighting device is configured, in use, to emit light, the light exit aperture being substantially parallel to the light exit plane. That is, the housing may be provided with an opening through which light may be emitted. The antennas may then project or extend outwardly through the opening of the housing.

Also, the lighting device may further comprise a light diffuser configured to cover at least part of the light exit aperture and the first and second antennas may contact or pass through the light diffuser. In this way, the antennas may extending to (or pass through) a light diffusing cover of the lighting device, thereby resulting in at least part of each antenna extending/projecting outside of the housing for improved RF signal transmission/reception strength.

In some embodiments, the control circuit may be configured to determine a signal transmission/reception strength value for each of the first and second antennas, and to selectively employ either the first antenna or the second antenna for transmission/reception of the control signal based on the determined signal transmission/reception strength values. In this way, embodiments may be configured to automatically detect and use the antenna with the transmission/reception strength, thus ensuring that optimal wireless communication efficiency is maintained at all times.

Some embodiments may further comprise a truncated conical reflector that is adapted to reflect light emitted from the lighting device, in use. The first and second antennas may be connected to opposite sides of the reflector. For instance, the antennas may be coupled to the inner (or outer) wall of the reflector at diametrically opposed positions.

In some embodiments, the lighting device may also further comprise a heat sink, and the first and second antennas may be spaced apart from the heat sink by at least 2 mm, and preferably at least 4 mm. For instance, embodiments may be configured such that the distance between an antenna and the closest metal body or housing is no less than 4 mm, thereby ensuring adequate RSSI value.

The wireless control signal may comprise a Radio Frequency, RF, control signal. Embodiments may therefore be configured for use with RF wireless communication systems.

In some embodiments, the lighting device may further comprise a light source (such as a light emitting diode, LED) coupled to the housing. The control circuit may then be configured to control emission of light from light source. That is, embodiments may be provided with a light source. However, it will be appreciated that other embodiments may be supplied without a light source, e.g. so that a conventional light source can be subsequently connected to the lighting device after the time of supplying the lighting device.

Embodiments may be employed in conjunction with conventional/existing luminaire support frames (e.g. pre-existing metal CANs). That is, embodiments may be provided separately from a luminaire support frame, e.g. so that an embodiment may be a subsequently connected to a pre-existing/conventional luminaire support frame. In this way, proposed embodiments may be employed to provide improved and/or extended functionality to conventional and/or pre-installed luminaire support frames. Other embodiments may be provided with a luminaire support frame.

Thus, according to another aspect of the invention, there may be provided a luminaire comprising: a luminaire support frame; and a lighting device according to proposed embodiment connected to the luminaire support frame, wherein the connection is configured to permit rotation of the lighting device relative to the luminaire support frame about the axis of rotation, such that, in use, the lighting device its tiltable relative to the luminaire support frame.

By way of example, the luminaire support frame may comprise a metal enclosure (such as a metal can). According to the proposed arrangement of the first and second antennas, when the lighting device is at a tilted position relative to the metal enclosure, one of the first and second antennas may be un-shielded by the metal enclosure.

Improved tiltable downlights/spotlights with wireless control functionality may therefore be provided by proposed concepts.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
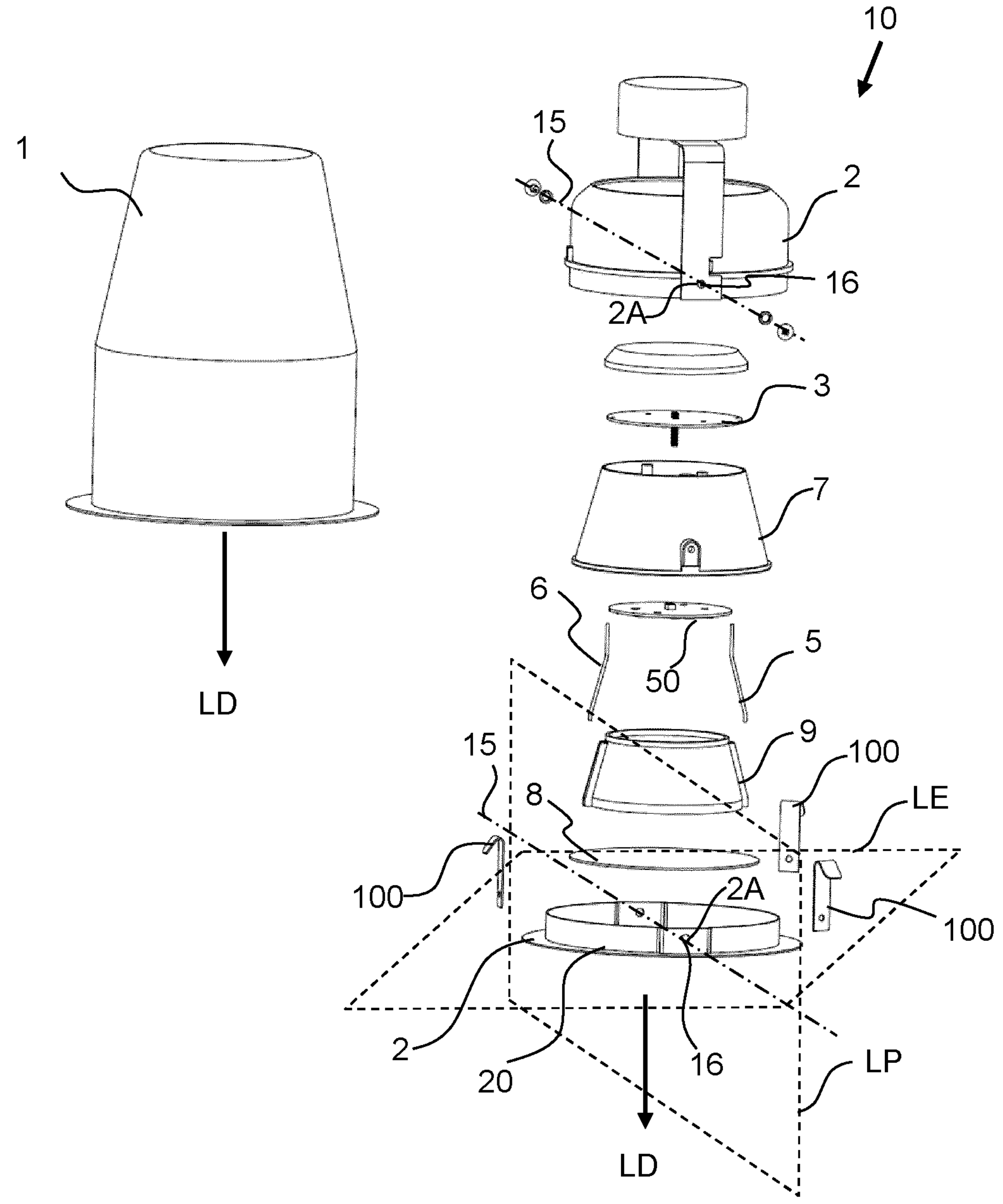
FIG. 1 is an exploded diagram illustrating the various components of a tiltable luminaire according to a proposed embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. The mere fact that certain measures are recited in mutually different dependent claims does not indicate that a combination of these measures cannot be used to advantage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

It should be understood that the Figures are merely schematic and are not drawn to scale. It should also be understood that the same reference numerals are used throughout the Figures to indicate the same or similar parts.

The invention proposes concepts for improving wireless communication performance of a lighting device having integrated wireless communication functionality. In particular, embodiments may provide a tilting lighting device that is configured to be titled about an axis of rotation, wherein the tilting lighting device has first and second antennas spaced apart from and on opposite sides of the axis of rotation. Such an arrangement of antennas overcome an issue of wireless communication signal shielding (caused by the luminaire support frame for example) by ensuring that, in use, one of the antennas extends/projects beyond a (signal-shielding) support frame irrespective of a tilt angle of the lighting device. That is, when the lighting device is at a tilted position relative to the luminaire support frame, one of the first and second antennas may be un-shielded by the luminaire support frame.

In particular, proposed concepts may provide improved wireless communication efficiency/performance of a titling light device with wireless control functionality. Accordingly, embodiments may be used in relation to tilting downlight or spotlight devices and/or provide improved tilting luminaires.

Embodiments may therefore provide improved RF signal transmission/reception strength for a lighting device having integrated wireless communication functionality. For instance, the proposed concept(s) may provide the advantage that RF signal transmission/reception strength may be maintained, irrespective of a tilt angle of the lighting device when in use. For example, through the employment of two antennas spaced apart on opposite sides of the axis of rotation of the lighting device, one of the antennas may always project/extend outwardly from the luminaire support frame and thus be unshielded by a signal-shielding part of a support frame. The antenna with stronger RF signal strength may be easily identified and thus used for RF signal transmission and/or reception. By way of example, the RSSI value may be obtained and compared for the first and second antennas.

By way of example only, illustrative embodiments may be utilized in many different types of titling downlight, spotlights directional luminaires.

Figure 2:
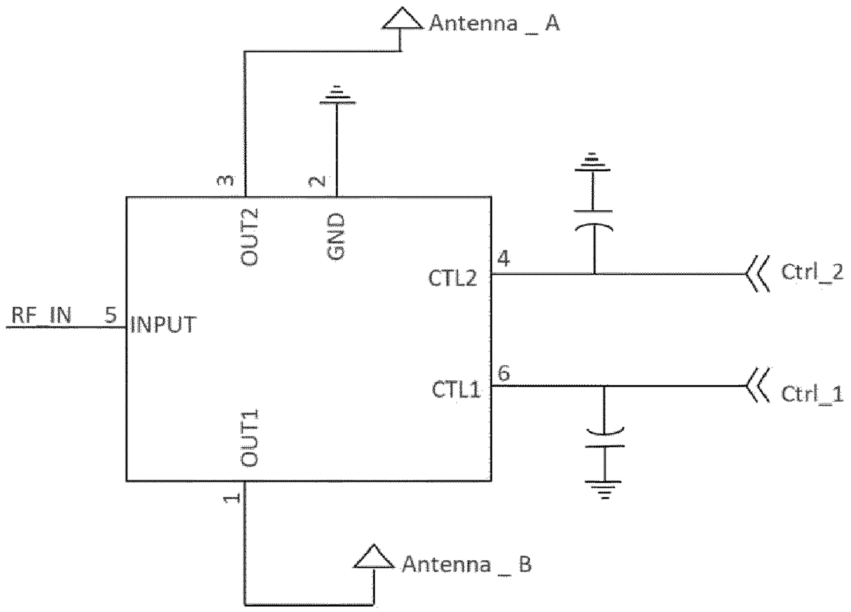
FIG. 2 is a schematic circuit diagram of the circuit provided on the RF board of the tiltable luminaire.
Figure 3:
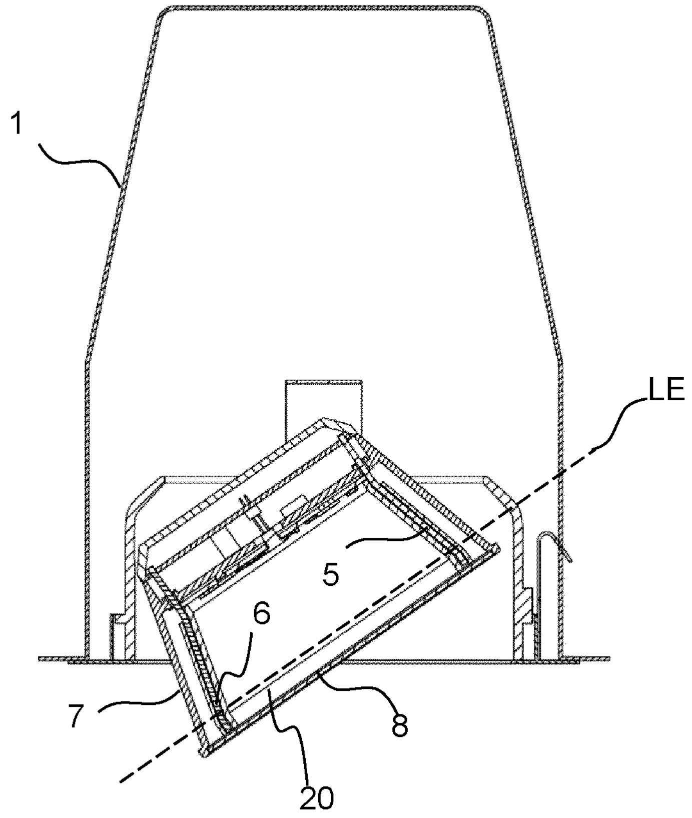
FIG. 3 is a cross-sectional diagram of the tiltable luminaire in use (and in a titled orientation)

Referring now to FIGS. 1-3, there is depicted a tiltable luminaire according to an embodiment of the invention. Specifically: FIG. 1 is an exploded diagram illustrating the various components of a tiltable luminaire according to a proposed embodiment; FIG. 2 is a schematic circuit diagram of the circuit provided on the RF board of the tiltable luminaire; and FIG. 3 is a cross-sectional diagram of the tiltable luminaire in use (and in a titled orientation).

The tiltable luminaire comprises a luminaire support frame 1 (which, in this example, comprises a metal enclosure 1); and a lighting device 10 connected to the luminaire support frame 1 (via hooks 100).

The connection of the luminaire support frame 1 and lighting device 10 is configured to permit rotation of the lighting device relative to the luminaire support frame about the axis of rotation, such that, in use, the lighting device 10 its tiltable relative to the luminaire support frame 1 (as depicted in FIG. 3).

The lighting device 10 comprises a housing 2 having a connection interface 2A configured to facilitate connection of the housing 2 to the luminaire support frame 1. The connection interface 2A defines an axis of rotation 15, such that, when connected to the support frame 1, the housing 2 is configured to permit rotation of the lighting device 10 relative to the luminaire support frame 1 about the axis of rotation 15.

The lighting device 10 also comprises a wireless communication interface 5,6 coupled to the housing 2. Here, the wireless communication interface comprises first 5 and second 6 antennas. The wireless communication interface and configured to transmit or receive, via a wireless communication link, a wireless control signal. In this example, the wireless control signal comprises a RF control signal. Wireless control signals of other suitable frequency ranges may be employed in other embodiments.

The lighting device also comprises a RF control circuit 3 that is coupled to the housing 2, and configured to: control an operation of a light source 50 of the lighting device; and transmit or receive a wireless control signal wireless to/from comprises first 5 and second 6 antennas.

The control circuit 3 and light source 50 are coupled to a heat sink 7 for improved dissipation of heat. Here, the heat sink 7 is generally truncated conical in shape, so that when it rotates about the axis of rotation 15 it does not hit/contact the housing 2. The heat sink 7 is preferably formed from thermally conductive material (i.e. a material with a high thermal conductivity), and thus typically comprises (at least in part) metal. This has the drawback that it can further shield reception/transmission of wireless communication signals (thus further increasing the importance of the proposed concept(s) for improving wireless communication efficiency/performance).

The lighting device 10 also comprises a plastic reflector 9 that is adapted to reflect light emitted from the light source 50, in use. The reflector is generally truncated conical in shape and configured to reflect light towards a light exit aperture 20 (described below) through which the lighting device 10 is configured, in use, to emit light.

According to the proposed concept(s), the first 5 and second 6 antennas are spaced apart from and on opposite sides of the axis of rotation. Specifically, as shown in FIG. 3, the first 5 and second 5 antennas are attached to grooves in the outer wall of the reflector 9 at opposite sides (i.e. at diametrically opposed positions). The size of the reflector 9 is adapted such that the first 5 and second 5 antennas are each spaced apart from an inner wall of the heat sink 7 by approximately 4 mm.

The control circuit 3 is configured to determine a signal transmission/reception strength value for each of the first 5 and second 6 antennas, and to selectively employ either the first antenna 5 or the second antenna 6 for transmission/reception of the control signal based on the determined signal transmission/reception strength values.

The connection interface comprises first and second apertures 16 located on opposite sides of the housing 2, and the axis of rotation 15 passes through the first and second apertures 16. The axis of rotation 15 lies in a lighting plane LP extending in a lighting direction LD of the lighting device 10. The first 5 and second 6 antennas are located on opposite sides of the lighting plane LP.

The axis of rotation 15 also lies in a light exit plane LE that is substantially perpendicular to the lighting plane LP.

The housing comprises a light exit aperture 20 through which the lighting device is configured, in use, to emit light from the light source 50, the light exit aperture being substantially parallel to the light exit plane. The lighting device also comprises a light diffuser 8 configured to cover at least part of the light exit aperture 20. In this example, the first 5 and second 6 antennas are arranged to intersect the light exit plane LE. In doing so, the first 5 and second 6 antennas contact or pass through the light diffuser 8.

As depicted in FIG. 3, in use, when the lighting device is at a tilted position relative to the metal enclosure 1, one of the first 5 and second 6 antennas is un-shielded by the metal enclosure 1. Specifically, in the exemplary illustration of FIG. 3, the second antenna 6 is un-shielded by the metal enclosure 1 as a result of projecting/extending outwardly from the metal enclosure 1, and thus attains a larger RSSI value than the first antenna 5.

From the above description, it will be understood that it is proposed to position first and second antenna wires on each side of the rotation axis of a tiltable lighting device. Such an arrangement may provide the benefit that is ensures one antenna wire is located outside the signal shield parts (e.g. metal housing) of the lighting device irrespective of the tiling direction of the lighting device.

A control circuit of the lighting device may automatically detect which of the antennas has a better signal reception/tranmission strength, and then use the detected antenna as the main antenna.

By way of example, a RF control circuit may be as depicted in FIG. 2, and the control signals Ctrl_1 and Ctrl_2 may control use of the first antenna 5 (Antenna_A) and second antenna 6 (Antenna_B) as illustrated in Table 1 below:

TABLE 1

| Ctrl_1 | Ctrl_2 | Antenna_A | Antenna_B |
|---|---|---|---|
| 0 | 1 | on | off |
| 1 | 0 | off | on |

The critria for selecting the main antenna may be based on the difference between the RSSI values for the antennas. For instance, the RSSI value for each antenna has been received and compared, if the difference between the RSSI values exceed a predetremined threshold value N (e.g. $0.5 \le N \le 8$), the antenna with the larger RSSI value can be selected for use as the main antenna.

With regard to antenna design, it will be understood by the reader that the length of antenna should comply with ¼λ. Thus, for RF contorl signals, the length of the antennsa should be about 25~30 mm. Also, it may be preferable for the antenna to be formed from metal materials, usch sch as copper or copper alloy, aluminium alloy, ferroalloys etc. Yet further, it may be preferbale that the distance between an antenna and its closest metal body or housing exceeds a preferreed minimum, e.g. about 2 mm, 4 mm or more.

Figure 4:
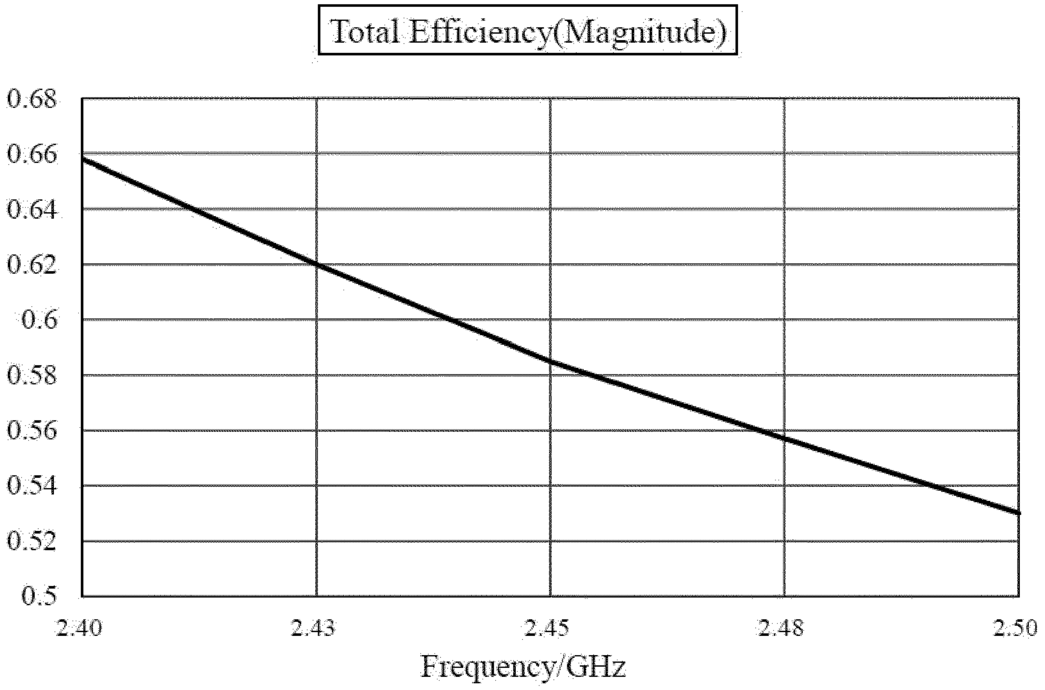
FIG. 4 is a graph of antenna efficiency (Y-axis) plotted against signal frequency for values ranging between 2.4 GHz and 2.5 GHz (X-axis), as obtained for the first antenna of the embodiment of FIG. 1-2 (when tilted 35° from the veritcal light plane axis so that the second antenna extends outside the housing, as depicted in FIG. 3)
Figure 5:
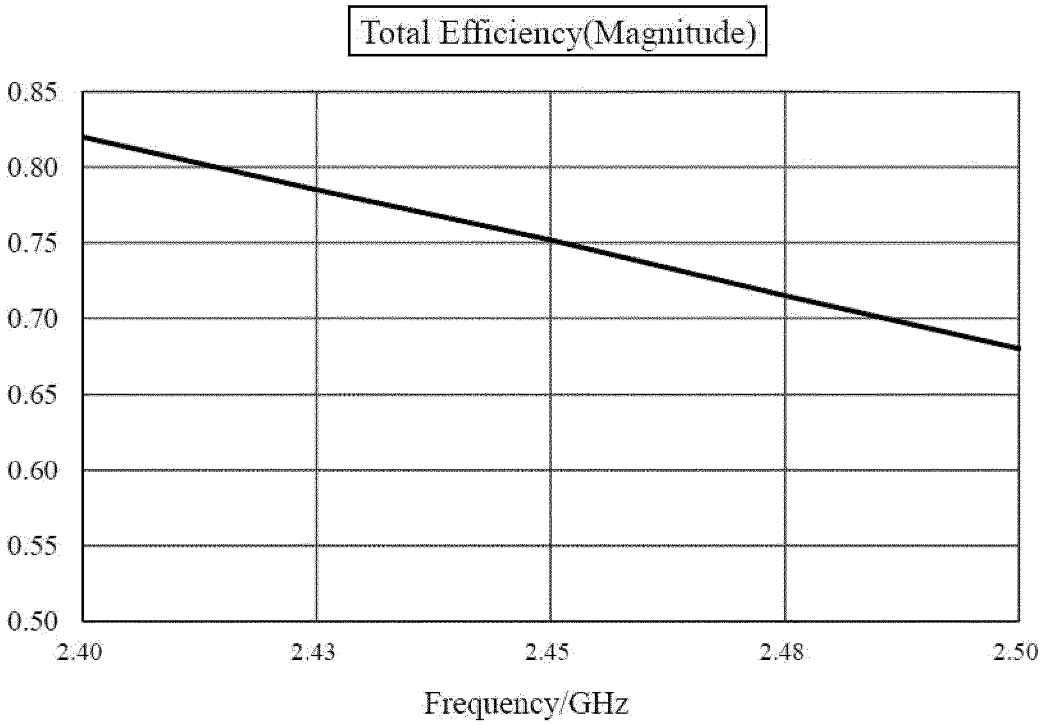
FIG. 5 is a graph of antenna efficiency (Y-axis) plotted against signal frequency for values ranging between 2.4 GHz and 2.5 GHz (X-axis), as obtained for the second antenna of the embodiment of FIGS. 1-3 (when tilted 35° from the veritcal light plane axis so that the second antenna extends outside the housing, as depicted in FIG. 3)

An example of the differing performance of first and second antennas arranged according to the proposed concept(s) is illustrated in FIGS. 4 and 5. FIG. 4 is a graph of antenna efficiency (Y-axis) plotted against signal frequency for values ranging between 2.4 GHz and 2.5 GHz (X-axis), as obtained for the first antenna of the embodiment of FIGS. 1-3 (when tilted 35° from the veritcal light plane axis so that the second antenna extends outside the housing, as depicted in FIG. 3). FIG. 5 is a graph of antenna efficiency (Y-axis) plotted against signal frequency for values ranging between 2.4 GHz and 2.5 GHz (X-axis), as obtained for the second antenna of the embodiment of FIGS. 1-3 (when tilted 35° from the veritcal light plane axis so that the second antenna extends outside the housing, as depicted in FIG. 3).

As shown in FIG. 4, the efficient of the first antenna (Antenna_A), the efficiency has a value of 58.5% at signal frequency of 2.45 GHz. FIG. 5, on the other hands, shows that the efficiency of the second antenna (Antenna_B) has a value of 75.2% at signal frequency of 2.45 GHz. That is, due the second antenna being unshielded by the luminaire support frame as a result of the tilt of the lighting device (relative to the luminaire support frame), the second antenna has a larger RSSI value and can be selected for use as the main antenna.

Figure 6:
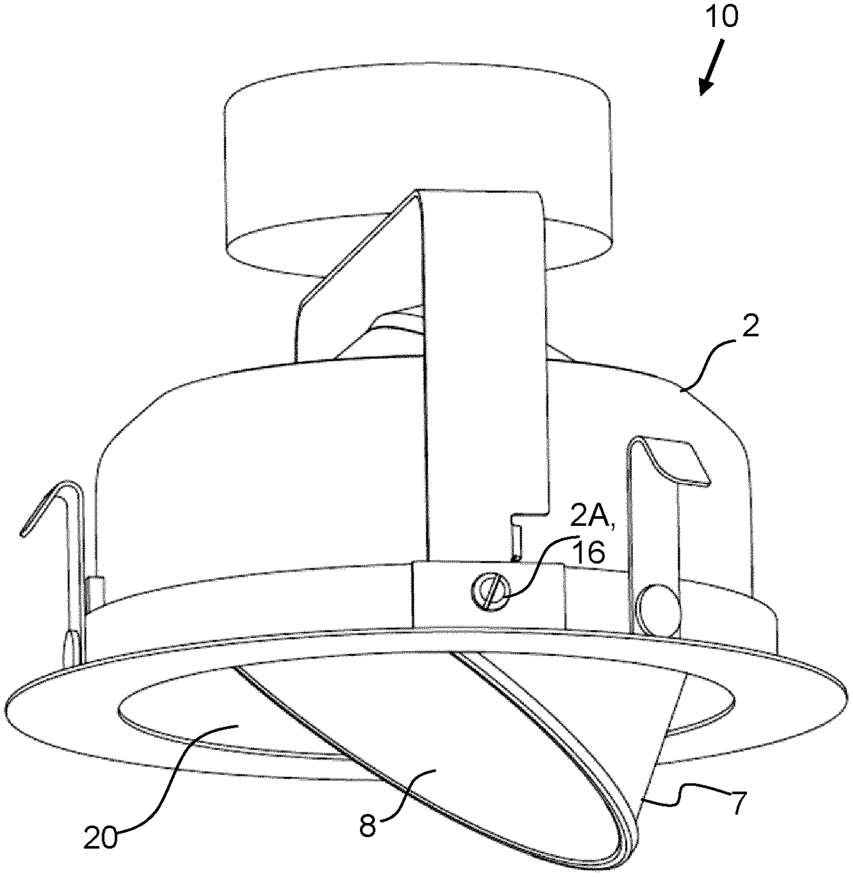
FIG. 6 depicts an assembled lighting device according to proposed embodiment.

Turning now to FIG. 6, there is depicted an assembled lighting device according to proposed embodiment, wherein the lighting device 10 is in a tilted configuration (i.e. the lighting device has been rotated about the axis of rotation so that an antenna project/extends downwardly beyond the light exit aperture of the housing 2).

The assembled lighting device may be provided (with or without a light source) for connection to a luminaire support frame. In this way, the lighting device may be arranged for connection to a pre-existing/conventional luminaire support frame. The embodiment of FIG. 6 may therefore provide improved and/or extended functionality to conventional and/or pre-installed luminaire support frames.

Of course, it will be appreciated that other embodiments may be provided with a luminaire support frame. That is, the lighting device may be assembled with a luminaire support frame prior to provision for use.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A luminaire comprising:

a luminaire support frame; and a lighting device connected to the luminaire support frame; wherein the lighting device comprises:

a housing comprising a connection interface configured to facilitate connection of the housing to the luminaire support frame and defining an axis of rotation, such that, when connected to the luminaire support frame, the housing is configured to permit rotation of the lighting device relative to the luminaire support frame about the axis of rotation;

a wireless communication interface coupled to the housing and configured to transmit or receive, via a wireless communication link, a wireless control signal; and a control circuit coupled to the housing and configured to: control an operation of the lighting device; and transmit or receive a wireless control signal wireless to/from communication interface, wherein the wireless communication interface comprises: first and second antennas spaced apart from and on opposite sides of the axis of rotation;

wherein the luminaire support frame comprises a metal enclosure and wherein, in use, when the lighting device is at a tilted position relative to the metal enclosure, one of the first and second antennas is un-shielded by the metal enclosure.

2. The luminaire of claim 1, wherein the connection interface comprises first and second apertures located on opposite sides of the housing, and wherein the axis of rotation passes through the first and second apertures.

3. The luminaire of claim 1, wherein the connection interface comprises first and second projections located on opposite sides of the housing, and wherein the axis of rotation-intersects the first and second projections.

4. The luminaire of claim 1, wherein the axis of rotation lies in a lighting plane extending in a lighting direction of the lighting device, and wherein the first and second antennas are located on opposite sides of the lighting plane.

5. The luminaire of claim 4, wherein the axis of rotation lies in a light exit plane that is substantially perpendicular to the lighting plane, and wherein the first and second antennas intersect the light exit plane.

6. The luminaire of claim 5, wherein the housing-comprises a light exit aperture through which the lighting device is configured, in use, to emit light, the light exit aperture being substantially parallel to the light exit plane.

7. The luminaire of claim 6, further comprising a light diffuser configured to cover at least part of the light exit aperture and wherein the first and second antennas contact or pass through the light diffuser.

8. The luminaire of claim 1, wherein the control circuit is configured to determine a signal transmission/reception strength value for each of the first and second antennas, and to selectively employ either the first antenna or the second antenna for transmission/reception of the control signal based on the determined signal transmission/reception strength values.

9. The luminaire of claim 1, wherein the lighting device further comprises a truncated conical reflector configured, in use, to reflect light emitted from the lighting device, and wherein the first and second antennas are connected to opposite sides of the reflector.

10. The luminaire of claim 1, wherein the lighting device further comprises a heat sink, and wherein the first and second antennas are spaced apart from the heat sink by at least 2 mm, and preferably at least 4 mm.

11. The luminaire of claim 1, wherein the wireless control signal comprises a Radio Frequency, RF, control signal.

12. The luminaire of claim 1, further comprising a light source coupled to the housing, and wherein the control circuit is configured to control emission of light by from light source.

13. The luminaire of claim 12, wherein the light source comprises a light emitting diode, LED.

* * * * *